(12) United States Patent
Yu et al.

(10) Patent No.: US 10,327,237 B2
(45) Date of Patent: Jun. 18, 2019

(54) HYBRID DUPLEX COMMUNICATION METHOD, BS AND TERMINAL

(71) Applicant: Samsung Electronics Co., Ltd, Gyeonggi-do (KR)

(72) Inventors: Bin Yu, Beijing (CN); Shichang Zhang, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 14/911,250

(22) PCT Filed: Aug. 5, 2014

(86) PCT No.: PCT/KR2014/007229
§ 371 (c)(1),
(2) Date: Feb. 9, 2016

(87) PCT Pub. No.: WO2015/020403
PCT Pub. Date: Feb. 12, 2015

(65) Prior Publication Data
US 2016/0192355 A1    Jun. 30, 2016

(30) Foreign Application Priority Data

Aug. 9, 2013  (CN) .......................... 2013 1 0347085

(51) Int. Cl.
*H04L 5/00*        (2006.01)
*H04L 5/14*        (2006.01)
(Continued)

(52) U.S. Cl.
CPC ...... *H04W 72/0446* (2013.01); *H04B 7/2656* (2013.01); *H04L 5/0053* (2013.01);
(Continued)

(58) Field of Classification Search
CPC .. H04L 5/0048–5/0055; H04L 5/0096–5/0098
See application file for complete search history.

(56) References Cited

U.S. PATENT DOCUMENTS

2004/0252659 A1   12/2004  Yun et al.
2008/0219670 A1    9/2008  Kim et al.
(Continued)

FOREIGN PATENT DOCUMENTS

CN    1538640 A    10/2004
CN    1960207 A     5/2007
(Continued)

OTHER PUBLICATIONS

International Search Report dated Nov. 7, 2014 in connection with International Patent Application No. PCT/KR2014/007229, 3 pages.
(Continued)

*Primary Examiner* — Marcus Smith

(57) ABSTRACT

The present disclosure provides a hybrid duplex communication method and apparatus. Configuration information is obtained. The configuration information includes locations of special sub-frames on the first carrier, and a transmission direction of each sub-frame on the second carrier. Sounding Reference Symbol (SRS) is sent on a special sub-frame. when all sub-frames on the second carrier are UL sub-frames, the UE may communicate with the BS on the first carrier and the second carrier according to the FDD mode; when the second carrier is used for UL and DL transmission in time division multiplexing mode, the UE may communicate with the BS on DL resources of the first carrier and UL resources of the second carrier according to the FDD mode, and/or, the UE may communicate with the BS on DL resources of the second carrier and UL resources of the second carrier according to the TDD mode.

12 Claims, 9 Drawing Sheets

(51) Int. Cl.
*H04W 72/04* (2009.01)
*H04B 7/26* (2006.01)

(52) U.S. Cl.
CPC .............. *H04L 5/0055* (2013.01); *H04L 5/14* (2013.01); *H04W 72/042* (2013.01)

(56) References Cited

U.S. PATENT DOCUMENTS

| | | |
|---|---|---|
| 2010/0067411 A1 | 3/2010 | Shinozaki |
| 2010/0322115 A1 | 12/2010 | Wei et al. |
| 2012/0135773 A1 | 5/2012 | Shen et al. |
| 2012/0243448 A1 | 9/2012 | Pan et al. |
| 2012/0257552 A1 | 10/2012 | Chen et al. |
| 2013/0242911 A1* | 9/2013 | Heo ........................ H04L 5/001 370/329 |
| 2015/0043392 A1* | 2/2015 | Susitaival ............. H04L 5/1469 370/280 |
| 2015/0043395 A1* | 2/2015 | Dai ........................ H04L 5/0037 370/280 |
| 2015/0071206 A1* | 3/2015 | Seo ........................ H04L 5/0053 370/329 |
| 2015/0103704 A1* | 4/2015 | Skov ................. H04W 72/0446 370/280 |
| 2015/0156006 A1* | 6/2015 | Takano ............... H04W 72/042 370/280 |
| 2015/0327263 A1* | 11/2015 | Chen ................. H04W 72/0446 370/280 |

FOREIGN PATENT DOCUMENTS

| | | |
|---|---|---|
| CN | 102014514 A | 4/2011 |
| KR | 10-2008-0081699 | 9/2008 |
| WO | 2010121515 A1 | 10/2010 |
| WO | WO 2013/014169 A1 | 1/2013 |

OTHER PUBLICATIONS

Written Opinion of the International Searching Authority dated Nov. 7, 2014 in connection with International Patent Application No. PCT/KR2014/007229, 5 pages.

The State Intellectual Property Office of the People's Republic of China First Office Action regarding Application No. 201310347085.6, dated Jun. 28, 2018, 12 pages.

\* cited by examiner

[Fig. 1]
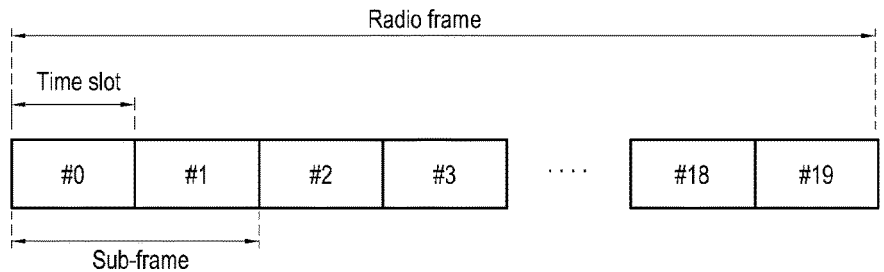
[Fig. 2]
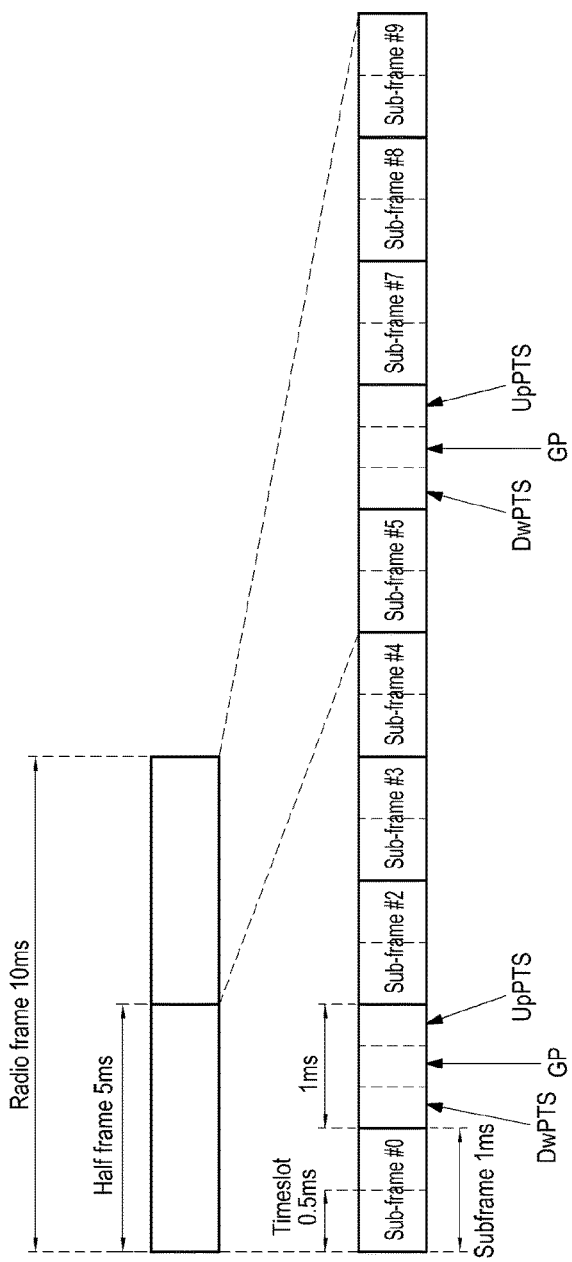

[Fig. 3]
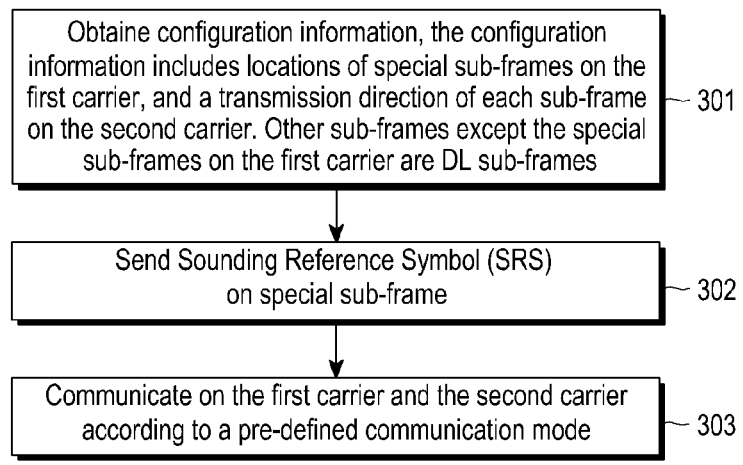

[Fig. 4]
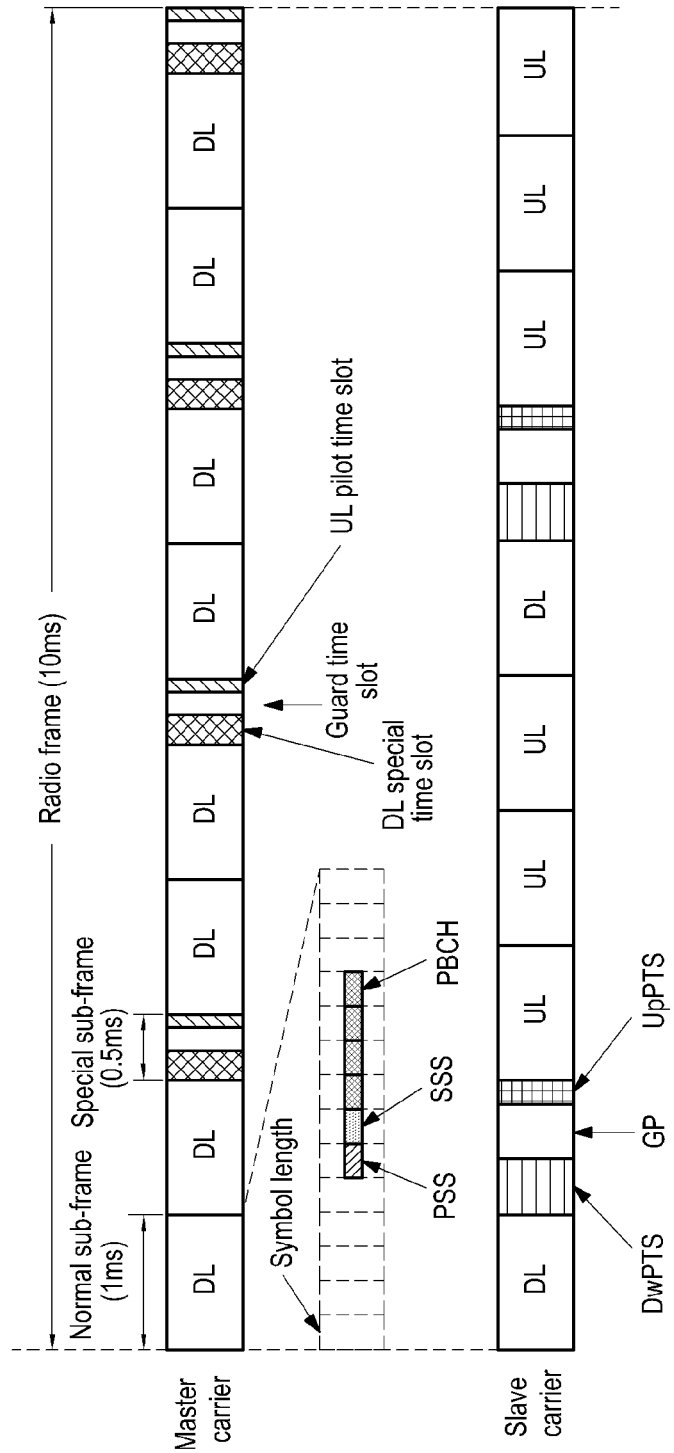

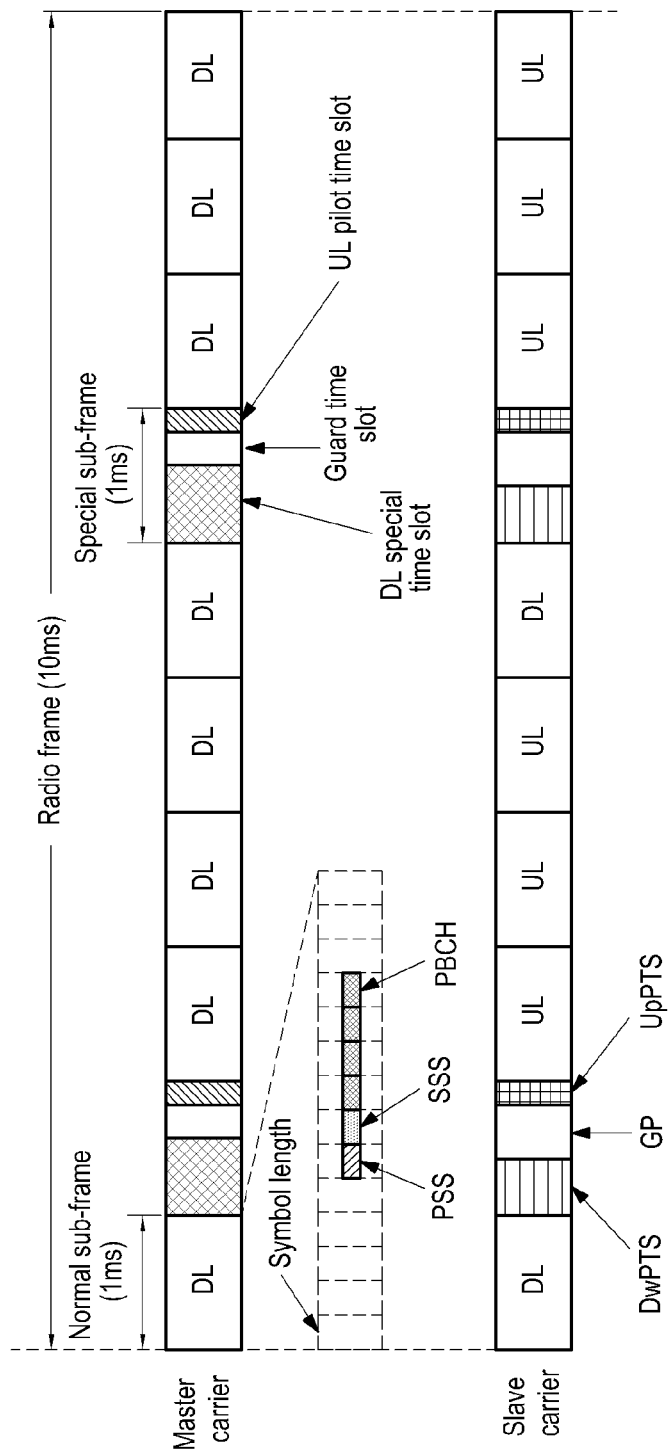
[Fig. 5]

[Fig. 6]
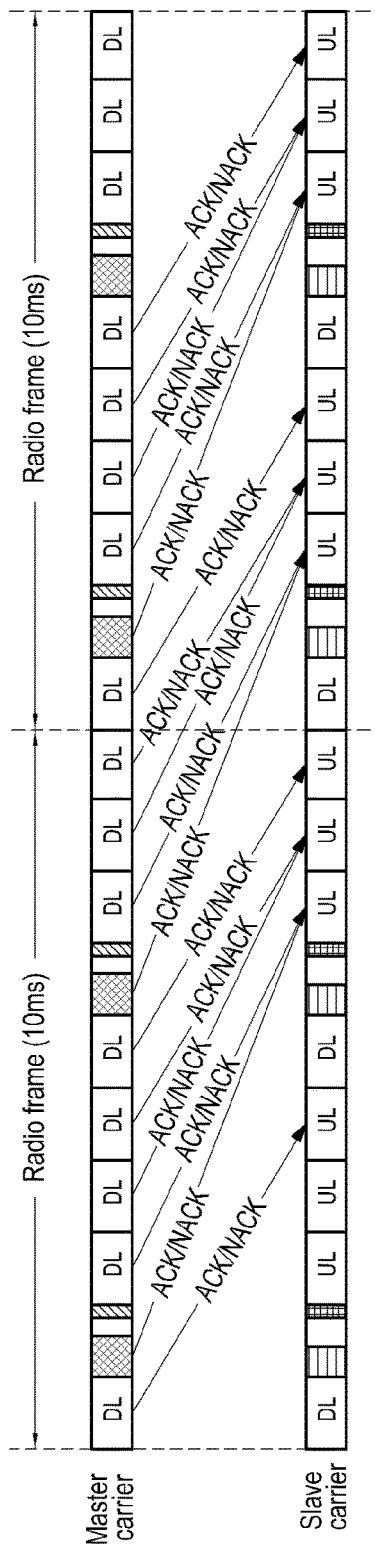

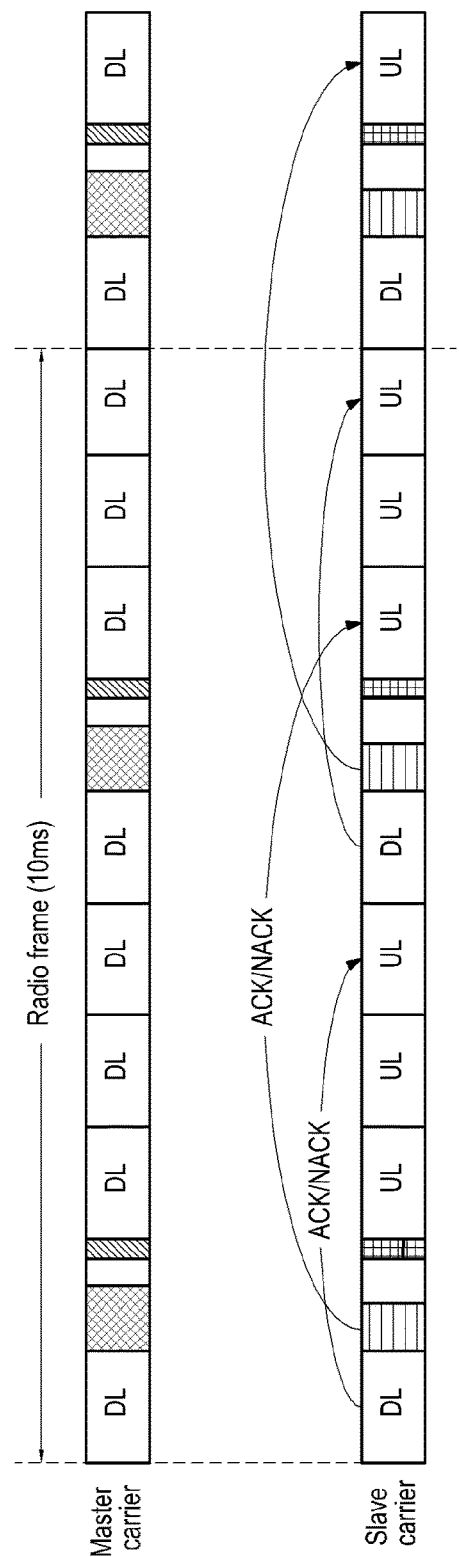
[Fig. 7]

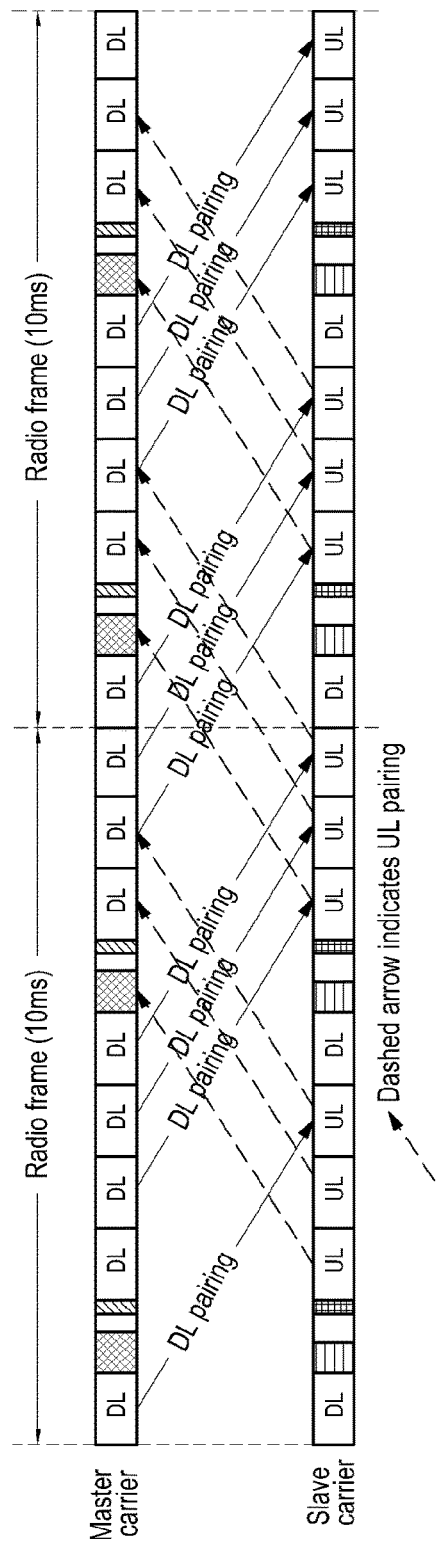
[Fig. 8]

[Fig. 9]
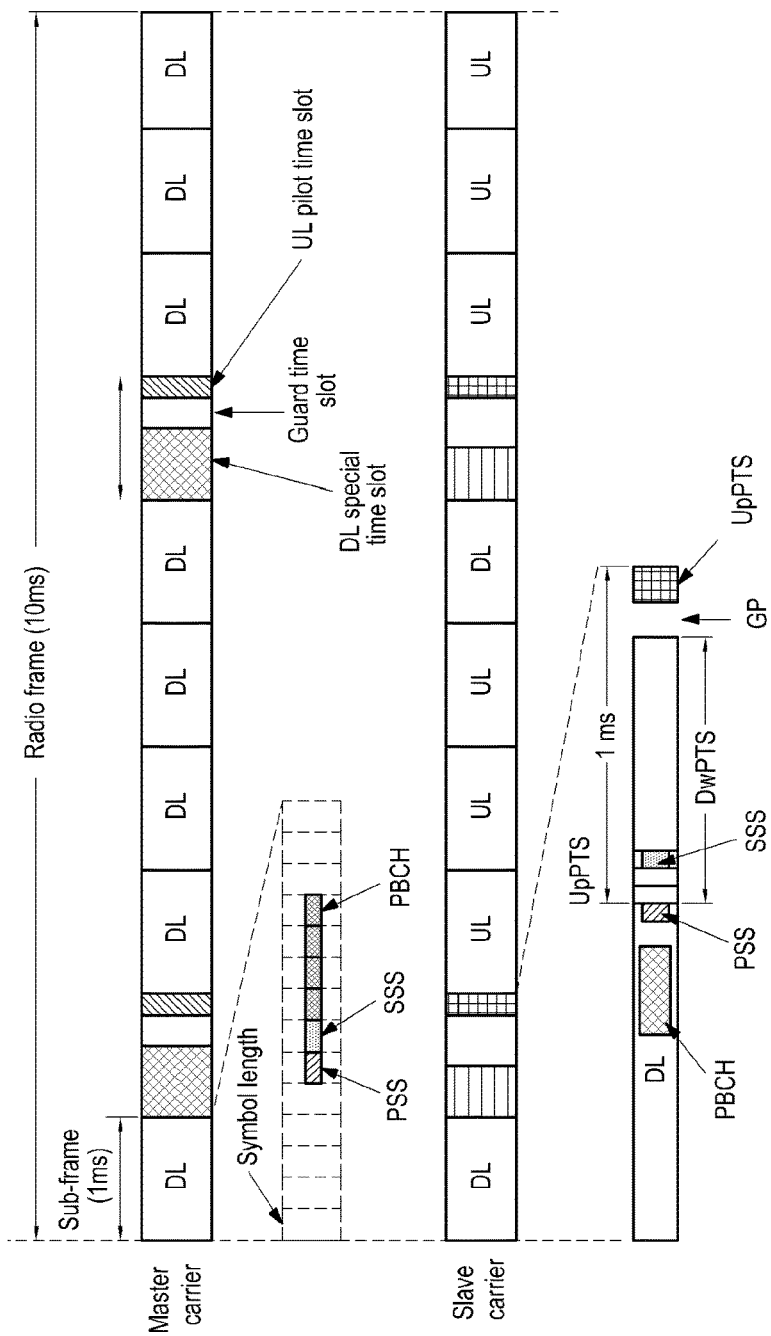
[Fig. 10]
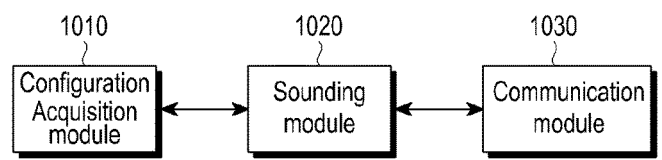

[Fig. 11]
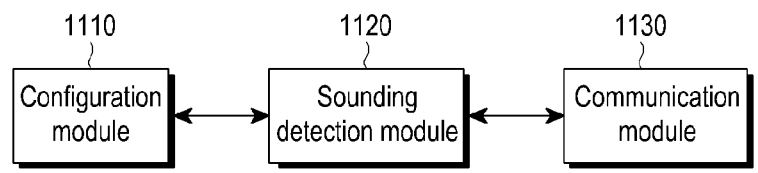

HYBRID DUPLEX COMMUNICATION METHOD, BS AND TERMINAL

CROSS-REFERENCE TO RELATED APPLICATION(S)

The present application claims priority under 35 U.S.C. § 365 to International Patent Application No. PCT/KR2014/007229 filed Aug. 5, 2014, entitled "HYBRID DUPLEX COMMUNICATION METHOD, BS AND TERMINAL", and, through International Patent Application No. PCT/KR2014/007229, to Chinese Application No. 201310347085.6 filed Aug. 9, 2013, each of which are incorporated herein by reference into the present disclosure as if fully set forth herein.

TECHNICAL FIELD

The present disclosure relates to wireless communication technologies, and more particularly, to a hybrid duplex communication method, Base Station (BS) and terminal.

BACKGROUND ART

In a wireless communication system, the Frequency Division Duplex (FDD) mode and the Time Division Duplex (TDD) mode are widely adopted. FDD refers to a mode that different frequency resources are respectively used for Uplink (UL) communication and Downlink (DL) communication. TDD refers to a mode that the same frequency resources are shared by UL and DL communication, and UL communication and DL communication are respectively performed based on time domain division.

For example, a Long Term Evolution (LTE) system corresponding to the Evolved Universal Terrestrial Radio Access (E-UTRA) protocol developed by the 3rd Generation Partnership Project (3GPP) supports two Duplex modes, FDD and TDD. Structure of a radio frame includes structure of a FDD frame and structure of a TDD frame.

Structure of a FDD frame is shown in FIG. 1, a UL radio frame or a DL radio frame with the length of 10 ms is composed of twenty time slots with the length of 0.5 ms and the numbers of 0~19, the time slot 2i and time slot 2i+1 form a sub-frame with the length of 1 ms, different frequency resources are respectively used in UL communication and DL communication. Structure of a TDD frame is shown in FIG. 2, a radio frame with the length of 10 ms is composed of two half frames with the length of 5 ms, each half frame contains 5 sub-frames with the length of 1 ms. Sub-frame i contains two time slots 2i and 2i+1 with the length of 0.5 ms. The same frequency resources are shared by UL and DL communication, and UL communication and DL communication are respectively performed on different sub-frames of a radio frame.

In above two frame structures, for a normal Cyclic Prefix (CP), one time slot includes 7 symbols with the length of 66.7??m, and the length of the CP of the first symbol is 5.21??m, the length of the CP of any of other 6 symbols is 4.69??m. For an extended CP, one time slot includes 6 symbols, and the length of the CP of each of all symbols is 16.67??m.

UL and DL configuration supported in TDD mode is shown in table 1, for each sub-frame in a radio frame, "D" indicates DL sub-frames, "U" indicates UL sub-frames, and S indicates special sub-frames used for three special domains, a DL Pilot Time Slot (DwPTS), a Guard Partition (GP) and an UL Pilot Time Slot (UpPTS). The lengths of DwPTS and UpPTS are shown in table 2. The lengths of above three special domains satisfies that the total length of DwPTS, GP and UpPTS is $30720 \cdot T_s = 1$ ms. Each sub-frame i is represented by two time slots 2i and 2i+1, the length of each time slot is $T_{slot} = 15360 \cdot T_s = 0.5$ ms, the unit of time $T_s$ is defined as $T_s = 1/(15000 \times 2048)$.

LTE TDD supports UL and DL switching periods of 5 ms and 10 ms. If the conversion point period from DL to unlink is 5 ms, the special sub-frames exist in two half frames. If the conversion point period from DL to unlink is 10 ms, the special sub-frames only exist in the first half frame. Sub-frame 0, sub-frame 5 and DwPTS are always used for DL transmission. UpPTS and sub-frames following the special sub-frames are dedicated to UL transmission. The configuration in table 1 may flexibly support different asymmetrical services. The special sub-frame configuration in table 2 may support GPs with different lengths, support different cell radius and avoid the strong interference between BSs in the TDD system.

TABLE 1

| Unlink-DL configuration number | Unlink-DL Conversion point period | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Special sub-frame configuration | Normal CP, DL | | | Extended CP, DL | | |
|---|---|---|---|---|---|---|
| | | UpPTS | | | UpPTS | |
| | DwPTS | Normal CP, UL | Extended CP, UL | DwPTS | Normal CP, UL | Extended CP, UL |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $219522 \cdot T_s$ | | | — | — | — |
| 8 | $24144 \cdot T_s$ | | | — | — | — |

Both TDD mode and FDD mode have its own advantages and disadvantages. For example, the UL and DL configuration shown in FIG. 1 is configurable, and is able to better support the asymmetric service, and increase the usage efficiency of spectrum. When there is more DL services on FDD paired spectrum, the UL spectrum resources will be wasted. However, since the spectrum of FDD is paired spectrum, there are always available UL and DL resources. Thus when a terminal timely feedbacks an UL control single, such as an Acknowledge/Non-Acknowledge (ACK/NACK) message of a Hybrid Automatic Retransmission Request (HARD), and Channel state information (CSI), the feedback delay of air interfaces may be decreased, and scheduling efficiency may be increased. In addition, since the same frequency resources may be shared in TDD system, the channel reciprocity may be achieved, thereby better using smart antennas. Therefore, in the future wireless communication system, if the advantages of both TDD mode and FDD mode may be integrated, and the two duplex modes are capable of being flexibly used or mixed in the light of different scenarios in the same network, the network performance and usage efficiency of spectrum will be greatly improved.

DISCLOSURE OF INVENTION

Technical Problem

The technical problem to be solved by the present disclosure is that FDD mode can only be used separately, and cannot flexibly combined with TDD mode in current wireless communication system, which restricts the performance and usage efficiency of spectrum of the wireless communication system.

In view of above, examples of the present disclosure provide a hybrid duplex communication method, BS and terminal, so as to improve the performance and usage efficiency of spectrum of the wireless communication system.

Solution to Problem

The hybrid duplex communication method provided by the present disclosure includes:

obtaining configuration information, the configuration information includes configuration of a location of a special sub-frame on a first carrier, and configuration of a transmission direction of each sub-frame on a second carrier; other sub-frames except the special sub-frame on the first carrier are downlink sub-frames;

sending a sounding reference symbol on the special sub-frame;

when all sub-frames on the second carrier are uplink sub-frames, a user equipment, UE, communicating with a base station, BS, on the first carrier and the second carrier according to the FDD mode;

when the second carrier is used for uplink and downlink transmission in time division multiplexing mode, the UE communicating with the BS on downlink resources of the first carrier and uplink resources of the second carrier according to the FDD mode, and/or, the UE communicating with the BS on downlink resources of the second carrier and uplink resources of the second carrier according to the TDD mode.

In an example, wherein the special sub-frame comprises a first time slot, a second time slot and a third time slot;

wherein the configuration information includes configuration of the length of each time slot in the special sub-frame;

receiving a downlink channel on the first time slot;

wherein the second time slot is a guard time slot;

wherein sending the sounding reference symbol on the special sub-frame comprises: sending the sounding reference symbol on the third time slot.

In another example, wherein the downlink channel received on the first time slot comprises at least one of the following channels: a physical downlink control channel, a physical downlink data channel, a physical synchronization channel, a physical broadcasting channel and a physical hybrid automatic retransmission request indicator channel.

wherein obtaining configuration information comprises: obtaining indication information indicating the number of special sub-frames, locations of the special sub-frames, and configuration of each time slot in the special sub-frames from a control signal received on the first carrier; obtaining indication information indicating uplink-downlink sub-frame ratio in frame structure of the second carrier from a control signal received on the first carrier or the second carrier; obtaining a frequency point location and bandwidth information of the second carrier from a control signal received on the first carrier.

In another example, wherein the control signal comprises: a signal sent in broadcast manner, or a dedicated signal sent to the UE.

In another example, wherein the indication information obtained from the control signal comprises an index;

the method further comprises: obtaining corresponding configuration information based on look-up table according to the index.

In another example, wherein the special sub-frames comprises at least one of multicast broadcast single frequency network, MBSFN, sub-frames.

In another example, the second carrier is a stand-alone TDD carrier.

In another example, wherein the method further comprises:

determining the timing relationship of a HARQ and/or the timing relationship for scheduling according to uplink-downlink sub-frame ratio of the first carrier and the second carrier.

In another example, when the UE communicating with the BS on downlink resources of the first carrier and uplink resources of the second carrier according to the FDD mode, determining the timing of a HARQ and/or the timing relationship for scheduling relationship according to the number and locations of uplink sub-frames in frame structure of the second carrier;

when the UE communicating with the BS on downlink resources of the second carrier and uplink resources of the second carrier according to the TDD mode, determining the timing of a HARQ and/or the timing relationship for scheduling relationship according to uplink-downlink sub-frame ratio and locations of sub-frames on the second carrier.

The base station provided by the present disclosure includes a configuration module, a sounding module and a communication module;

the configuration module is configured to obtain configuration information, and configure locations of special sub-frames on a first carrier and a transmission direction of each sub-frame on a second carrier; other sub-frames except special sub-frames on the first carrier are downlink sub-frames;

the sounding module is configured to send a SRS on a special sub-frame;

the communication module is configured to, when all sub-frames on the second carrier are uplink sub-frames, communicate with a BS on the first carrier and the second carrier according to a frequency division duplex, FDD, mode; and when the second carrier is used for uplink and downlink transmission in time division multiplexing mode, communicate with the BS on downlink resources of the first carrier and uplink resources of the second carrier according to the FDD mode, and/or, communicate with the BS on downlink resources of the second carrier and uplink resources of the second carrier according to a time division duplex, TDD, mode.

The terminal provided by the present disclosure includes a configuration module, a sounding detection module and a communication module;

the configuration module is configured to configure locations of special sub-frames on a first carrier and a transmission direction of each sub-frame on a second carrier; other sub-frames except special sub-frames on the first carrier are downlink sub-frames;

the sounding detection module is configured to receive a SRS on a special sub-frame on the first carrier;

the communication module is configured to, when all sub-frames on the second carrier are uplink sub-frames, communicate with a terminal on the first carrier and the second carrier according to a frequency division duplex, FDD, mode; and when the second carrier is used for uplink and downlink transmission in time division multiplexing mode, communicate with the terminal on downlink resources of the first carrier and uplink resources of the second carrier according to the FDD mode, and/or, communicate with the terminal on downlink resources of the second carrier and uplink resources of the second carrier according to a time division duplex, TDD, mode.

As can be seen from above technical solutions, the present disclosure integrates advantages of the TDD mode and the TDD mode, makes advantages of the TDD mode and the TDD mode complement each other to constitute a hybrid duplex communication system. Thus the working mode of hybrid duplex may be flexibly configured according to network requirements based on conventional paired FDD spectrum, simultaneously the compatibility to a LTE FDD terminal and a LTE TDD terminal may be achieved.

BRIEF DESCRIPTION OF DRAWINGS

The above and other aspects, features and advantages of certain exemplary embodiments of the present disclosure will be more apparent from the following description taken in conjunction with the accompanying drawings, in which:

FIG. 1 is a schematic diagram illustrating frame structure in FDD mode;

FIG. 2 is a schematic diagram illustrating frame structure in TDD mode;

FIG. 3 is a flow char illustrating a hybrid duplex communication method according to an example of the present disclosure;

FIG. 4 is a schematic diagram illustrating a channel and frame structure of a hybrid duplex communication system according to an example of the present disclosure;

FIG. 5 is a schematic diagram illustrating a channel and frame structure of a hybrid duplex communication system according to another example of the present disclosure;

FIG. 6 is a schematic diagram illustrating a time-sequence relationship of FDD mode of a hybrid duplex communication system according to an example of the present disclosure;

FIG. 7 is a schematic diagram illustrating a time-sequence relationship of TDD mode of a hybrid duplex communication system according to another example of the present disclosure;

FIG. 8 is a schematic diagram illustrating a hybrid duplex communication system compatible with a LTE FDD terminal according to an example of the present disclosure;

FIG. 9 is a schematic diagram illustrating a channel and frame structure of a hybrid duplex communication system compatible with a LTE FDD terminal according to an example of the present disclosure;

FIG. 10 is a schematic diagram illustrating a terminal according to an example of the present disclosure;

FIG. 11 is a schematic diagram illustrating a BS according to an example of the present disclosure.

MODE FOR THE INVENTION

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In order to make objectives, technical solutions and advantages of the present disclosure clearer, the present disclosure will be described in detail hereinafter with reference to accompanying drawings and embodiments.

In order to solve the problem existed in the prior art, examples of the present disclosure provide a hybrid duplex communication system and corresponding hybrid duplex communication method. FIG. 3 is a flow char illustrating a hybrid duplex communication method according to an example of the present disclosure. As shown in FIG. 3, the method may include the following operations.

In block 301, configuration information is obtained, the configuration information includes configuration of location(s) of special sub-frame(s) on the first carrier, and configuration of a transmission direction of each sub-frame on the second carrier are configured. Other sub-frames except the special sub-frame(s) on the first carrier are DL sub-frames.

In block 302, Sounding Reference Symbol(s) (SRS(s)) is sent on the special sub-frame(s).

In block 303, a User Equipment (UE) communicates with a BS on the first carrier and the second carrier according to a pre-defined communication mode. Specifically, when all sub-frames on the second carrier are UL sub-frames, the UE may communicate with the BS on the first carrier and the second carrier according to the FDD mode; when the second carrier is used for UL and DL transmission in time division multiplexing mode, the UE may communicate with the BS on DL resources of the first carrier and UL resources of the second carrier according to the FDD mode, and/or, the UE may communicate with the BS on DL resources of the second carrier and UL resources of the second carrier according to the TDD mode.

Based on the method shown in FIG. 3, a hybrid duplex communication mode may be configured on paired frequency resources (namely carriers), thus in a cell configured with paired carriers, the BS may communicate with the UE based on hybrid duplex communication mode. For simplicity of the description hereinafter, the first carrier is called a master carrier, and the second carrier is called a slave carrier hereinafter. The communication resources on carriers are divided into a series of radio frames in time domain, each radio frame is composed of several sub-frames.

In the present disclosure, the structure of a radio frame on the master carrier includes a special sub-frame, and the special sub-frame is named relative to a normal sub-frame. The length of the special sub-frame is configurable. The system may support only one length of the special sub-frame, or the length of the special sub-frame may be defaulted to quail to the length of the normal sub-frame. When the system supports a variety of special sub-frame lengths, configuration information in block 301 may further include length information indicating the length of the special sub-frame. The length information may be represented by a ratio of the length of the special sub-frame to the length of the normal sub-frame.

In the present disclosure, the special sub-frame at least includes a time slot for sending the sounding pilot single. Preferably, the special sub-frame may include three parts, namely a DL special time slot, a guard time slot, and an UL pilot time slot. The number of special sub-frames, locations of the special sub-frames, and the ratio of each time slot in the special sub-frames, on the master carrier, are configurable. The terminal may obtain the configuration information through a corresponding control signal on the master carrier.

The DL special time slot in the special sub-frame is used for DL transmission, and may be used for transmission of one or more of the following multiple channels: a physical DL control channel (PDCCH), a physical DL data channel, a physical synchronization channel, a physical broadcasting channel (PBCH) and a physical hybrid ARQ indicator channel. The PDCCH is used to bear and schedule the physical DL data channel, and schedule a physical layer control signal of a physical UL data channel. The physical hybrid ARQ indicator channel is used to bear an ACK/NACK message indicating a receiving state for the physical UL data channel. The physical synchronization channel is used to bear a synchronization signal for DL synchronization.

The UL pilot time slot in the special sub-frame is used to bear the SRS.

The guard time slot in the special sub-frame is a blank time slot, which is used to provide the time required by the RF switching from DL to UL, maintain the UL sending timing advance of the UL synchronization, provide the fixed UL sending timing advance required by the RF switching from UL to DL, and necessarily prevent the interference resulted from the sending from DL to UL. The BS does not send DL signal in the guard time slot.

The special sub-frame will be described with reference to accompanying drawings and two examples.

FIG. 4 is a schematic diagram illustrating a channel and frame structure of a hybrid duplex communication system according to an example of the present disclosure. As shown in FIG. 4, the length of a special sub-frame is half of the length of a normal sub-frame, namely the length of a special sub-frame is 0.5 ms. Each radio frame includes 4 special sub-frames.

FIG. 5 is a schematic diagram illustrating a channel and frame structure of a hybrid duplex communication system according to another example of the present disclosure. As shown in FIG. 5, the length of a special sub-frame is equal to the length of a normal sub-frame, namely the length of a special sub-frame is 1 ms. Each radio frame includes 2 special sub-frames.

Compared with the frame structure shown in FIG. 5, in the frame structure shown in FIG. 4, the density of special sub-frames in a radio frame in time domain is increased, so that the density of SRSs is also increased. For the case that the channel changes quickly (for instance, the Doppler spread is larger), the increase of the density of SRSs may result in the increase of the accuracy of channel estimation, thus the better channel reciprocity service may be provided, simultaneously the number of the normal sub-frames will not be affected.

Other sub-frames except the special sub-frames in the radio frame of the master carrier are DL sub-frames. In the structure of a radio frame of the slave carrier, the radio frame may be configured as full-UL sub-frames, or part of the radio frame is configured as UL sub-frames, and the other part of the radio frame is configured as DL sub-frames, the UL sub-frames and DL sub-frames share resources on the slave carrier in time division duplexing mode.

The frame structure of radio frame on the slave carrier is configured by a signal of the master carrier. According to the UL and DL traffic volume in a practical network, the slave carrier may be configured as full-UL sub-frame carrier or UL and DL time division duplexing carrier.

The UL pilot time slot of the master carrier is sent on the master carrier. When the slave carrier is configured as full-UL sub-frame carrier, the DL sub-frames of the master carrier and the UL sub-frames of the slave carrier may perform communication according to conventional FDD mode. When the slave carrier is configured as a UL and DL time division duplexing carrier, the DL sub-frames of the master carrier and the UL sub-frames of the slave carrier may cooperate to perform FDD mode communication in which the UL and the DL is not in equal proportion, and the DL sub-frames of the slave carrier and the UL sub-frames of the slave carrier may cooperate to perform communication according to conventional TDD mode.

The terminal may be informed of configuration information of special sub-frames on the master carrier and configuration information of frame structure of the slave carrier by means of broadcast or a specific dedicated signal of the terminal. Furthermore, a table may be adopted. The terminal may be informed of an index in the table through the signal, and may obtain the configuration information of special sub-frames on the master carrier and configuration information of frame structure of the slave carrier by looking up the table based on the index. In addition, when obtaining no configuration information, the terminal may determine that the master carrier is a full-DL carrier without any special sub-frame by default, and determine that the slave carrier is a full-UL carrier by default.

The BS in the hybrid duplex communication system may perform transmission in DL sub-frames on the master carrier and the slave carrier, and receive a SRS sent by a UE capable of the hybrid duplex frame structure in the UL pilot time slot of a special sub-frame on the master carrier to obtain the channel reciprocity. Thus the feedback overhead required by multi-antenna transmission (e.g., beam forming) may be reduced.

In addition, in the hybrid duplex communication system, the followings may be pre-appointed. The timing relationship of a HARQ of UL and DL transmission and/or the timing relationship for scheduling may be implicitly determined by a UL-DL configuration in frame structure of the hybrid duplex communication system. Furthermore, when the DL sub-frames of the master carrier and the UL sub-frames of the slave carrier cooperate to perform FDD mode communication, the timing relationship of a HARQ of DL transmission may be implicitly determined by a UL configuration in the frame structure of the slave carrier. The UL configuration refers to the number and locations of UL sub-frames in the radio frame. When the DL sub-frames of the slave carrier and the UL sub-frames of the slave carrier cooperate to perform FDD mode communication, the timing relationship of a HARQ of DL transmission may be implicitly determined by a UL-DL configuration of the slave carrier. The UL-DL configuration refers to the configuration ratio of UL to DL sub-frames in the radio frame and locations of the UL and DL sub-frames in the radio frame. Furthermore, the UL transmission is scheduled by the master carrier. Preferably, the timing of the UL transmission adopts 10 ms RTT.

The technical solutions of the present disclosure will be further described with reference to several examples.

The First Example

In the example, the hybrid duplex communication system adopts frame structure parameters of the LTE, including subcarrier interval, Cyclic Prefix (CP), length of a radio frame and length of a sub-frame. For a normal CP, one sub-frame includes 14 symbols with the length of 66.7 μm, and the length of the CP of the first symbol is 5.21 μm, the length of the CP of any of other 6 symbols is 4.69 μm. For an extended CP, one sub-frame includes 12 symbols, and the length of the CP of each of all symbols is 16.67 μm.

As shown in FIG. 5, the hybrid duplex communication system includes paired carriers. The radio frame structure of the master carrier includes special sub-frames, and each special sub-frame includes a DL special time slot, a guard time slot, and an UL pilot time slot. The Primary Synchronization signal (PSS), Secondary Synchronization Signal (SSS) and PBCH of the master carrier may be used by the terminal to perform cell search, and are sent in the DL special time slot in the special sub-frame.

In addition, just like the LTE system, the master carrier further includes a Dynamic Broadcasting channel (DBCH). A PDCCH is used to schedule and indicate the DBCH, bear necessary System Information Blocks (SIBs) except Master Information Blocks (MIBs) on the PBCH.

The hybrid duplex wireless communication BS may perform DL transmission in DL sub-frames and DL special time slots on the master carrier, and receive a SRS in the UL pilot time slot of a special sub-frame on the master carrier to obtain the channel reciprocity. Thus the feedback overhead required by multi-antenna transmission (e.g., beam forming) may be reduced.

The UE capable of hybrid duplex mode, namely the UE capable of the hybrid duplex frame structure, may perform cell search in the master carrier to obtain DL synchronization and a cell identifier, and then read broadcast information on the master carrier.

A broadcast messages sent by the hybrid duplex wireless communication BS includes configuration information of special sub-frames (denoted by IE-X), indicating the number, locations of special sub-frames in the radio frame, and length configuration information of each time slot (the length is represented by the number of symbols). The configuration information may be sent based on look-up table. For example, an established configuration table may include various configuration combinations supported by the system. The terminal may be informed of an index in the configuration table through the signal, and may obtain configuration information of special sub-frames on the master carrier by looking up the configuration table based on the IE-X. As shown in FIG. 5, suppose the terminal, according to an index indicated by bits of the IE-X, obtains that one radio frame includes 2 special sub-frames respectively located at the second sub-frame and the seventh sub-frame, and obtains the length of each time slot in a special sub-frame by looking up the configuration table. The UL pilot time slot is configured with multiple symbols, which increases the resource capacity of the SRS. Thus the BS may schedule more users to send more timely SRS, thereby increasing the system performance.

The broadcast message sent by the hybrid duplex wireless communication BS further includes frequency location (i.e. notification of the EUTRA Absolute Radio Frequency Channel Number (EARFCN) and bandwidth information of the slave carrier, and configuration information of radio frame structure (denoted by IE-Y). The configuration information may be sent based on look-up table. The configuration combinations shown in table 1 and table 2 may be obtained. As shown in FIG. 5, the BS may configure the slave carrier as UL and DL time division duplexing carrier according to the requirements of ratio of UL services to DL services, the terminal may, according to the IE-Y, obtain that the first sub-frame and the sixth sub-frame of a radio frame of the slave carrier are DL sub-frames, the second sub-frame and the seventh sub-frame are special sub-frames, other sub-frames are normal UL sub-frames. The broadcast message further includes necessary configuration information for network access and UL data transmission by the terminal, for example, configuration information of Random Access Channel (RACH) and so forth.

According to pre-conventions, the BS and the terminal may adopt that the DL sub-frames of the master carrier and the UL sub-frames of the slave carrier cooperates to perform FDD mode communication in which the UL and the DL is not in equal proportion, and the DL sub-frames of the slave carrier and the UL sub-frames of the slave carrier may cooperate to perform conventional TDD mode communication. The timing relationship of a HARQ of data transmission and/or the timing relationship for scheduling are predetermined, and are related to UL configuration of the slave carrier. When the DL sub-frames of the master carrier and the UL sub-frames of the slave carrier cooperate to perform FDD mode communication, the timing relationship may be implicitly determined by a UL configuration of the slave carrier. When the DL sub-frames of the slave carrier and the UL sub-frames of the slave carrier cooperate to perform TDD mode communication, the timing relationship may be implicitly determined by a UL-DL configuration of the slave carrier. For example, in table 1, there are seven UL-DL configurations, and each UL-DL configuration implicitly determines corresponding timing relationship. The terminal obtains a UL-DL configuration of the slave carrier (for example the UL-DL configuration #1 may be obtained by means of a signal), so that the terminal may lean that the 3, 4, 5, 7, 8, 9 sub-frames are UL sub-frames, the ACK/NACK message for the HARQ of DL data transmission of the master carrier adopts the timing relationship shown in FIG. 6 (when the timing relationship is pre-determined, the compromise of ACK/NACK load balance and time delay will be considered), and the ACK/NACK message for the HARQ of DL data transmission of the slave carrier adopts the timing relationship shown in FIG. 7. The UL data transmission is similar to above mentioned processing.

The Second Example

In the example, the hybrid duplex communication system adopts frame structure parameters of the LTE, including subcarrier interval, CP, length of a radio frame and length of a sub-frame. For a normal CP, one sub-frame includes 14 symbols with the length of 66.7 μm, and the length of the CP of the first symbol is 5.21 μm, the length of the CP of any of other 6 symbols is 4.69 μm. For an extended CP, one sub-frame includes 12 symbols, and the length of the CP of each of all symbols is 16.67 μm.

Except the special sub-frames, the hybrid duplex communication system adopts designs of the LTE, so that the hybrid duplex communication system is capable of providing better services for terminal capable of the hybrid duplex mode, simultaneously the hybrid duplex communication system is compatible with the LTE FDD system.

According to the frame structure of the master carrier and the slave carrier shown in FIG. 5, the terminal capable of the hybrid duplex mode and a terminal of the LTE FDD system may perform cell search on the master carrier according to the PSS, SSS and PBCH shown in the figure to obtain DL synchronization and a cell identifier, and then read necessary broadcast signal SIB born by the DBCH.

The BS may only configure one or several of Multicast Broadcast Single Frequency Network (MBSFN) sub-frames capable of being configured with Multimedia Broadcast Multicast Service (MBMS) in LTE FDD mode as special sub-frame(s). As shown in FIG. 5, suppose the BS configures the second and seventh sub-frames of the master carrier as special sub-frames, the BS may, through MBSFN sub-frame configuration, make a LTE FDD terminal take the second and seventh sub-frames as MBSFN sub-frames. Only the terminal capable of the hybrid duplex frame structure may know that the second and seventh sub-frames are special sub-frames. Thus the LTE FDD terminal will not measure the second and seventh sub-frames.

The BS may notify all terminals of configuration information of the PRACH through a broadcast message. The BS may send a notification of carrier frequency point location of the slave carrier (notification of EARFCN) and bandwidth information of the slave carrier through broadcast information, like the notification of UL carrier frequency point location and bandwidth in LTE FDD system.

The BS may send configuration information of special sub-frames in a radio frame of the master carrier and configuration information of frame structure of the slave carrier to the terminal capable of the hybrid duplex frame structure through a specific dedicated signal (e.g., a physical layer control signal, a Medium Access Control (MAC) signal or a Radio Resource Control (RRC) signal). The configuration of radio frame structure of the slave carrier needs to guarantee that a sub-frame where a Physical Random Access Channel (PRACH) allocated in the broadcast information is located is a UL sub-frame. Before receiving the signal, similar to a LTE FDD terminal, the terminal capable of the hybrid duplex frame structure does not perform extra operations on the MBSFN sub-frame, and takes the slave carrier as full-ULs carrier, complete a cell access process according to information indicated in the broadcast message, and obtain a terminal identifier in the cell (C-RNTI). The BS controls the UL scheduling to avoid that resources on the slave carrier granted to the terminal for UL transmission are used for DL receiving by other terminal during this period, namely, UL transmission should not be scheduled on the resources configured as DL by BS. The BS may also send the configuration information through broadcast messages, just like the example 1, and a LTE FDD terminal cannot parse the broadcast messages, and will ignore the broadcast messages. To avoid redundancy, no examples for further description will be given hereinafter.

After the terminal capable of the hybrid duplex frame structure obtains above mentioned signal, according to pre-conventions, the BS and the terminal capable of the hybrid duplex frame structure may adopt that the DL sub-frames of the master carrier and the UL sub-frames of the slave carrier cooperates to perform FDD mode communication in which the UL and the DL is not in equal proportion, and the DL sub-frames of the slave carrier and the UL sub-frames of the slave carrier may cooperate to perform conventional TDD mode communication. The timing relationship of a HARQ of data transmission and/or the timing relationship for scheduling are pre-determined, and are related to UL configuration of the slave carrier. When the DL sub-frames of the master carrier and the UL sub-frames of the slave carrier cooperate to perform FDD mode communication, the timing relationship may be implicitly determined by a UL configuration of the slave carrier. When the DL sub-frames of the slave carrier and the UL sub-frames of the slave carrier cooperate to perform TDD mode communication, the timing relationship may be implicitly determined by a UL-DL configuration of the slave carrier. The terminal obtains a UL-DL configuration of the slave carrier (for example the UL-DL configuration #1 may be obtained by means of a signal), so that the terminal may lean that the 3, 4, 5, 7, 8, 9 sub-frames are UL sub-frames, the ACK/NACK message for the HARQ of DL data transmission of the master carrier adopts the timing relationship shown in FIG. 6, and the ACK/NACK message for the HARQ of DL data transmission of the slave carrier adopts the timing relationship shown in FIG. 7. The UL data transmission is similar to above mentioned processing.

The LTE FDD terminal not capable of the hybrid duplex frame structure, strictly complies with the scheduling of the BS and the resource configuration informed on broadcast channel to send UL data and UL control signal only in part of UL sub-frames on the slave carrier, and not to receive DL data in special sub-frames configured on the master carrier. Thus the hybrid duplex communication system is transparent to the LTE FDD terminal. As shown in FIG. 8, for the LTE FDD terminal not capable of the hybrid duplex frame structure, the BS schedules DL sub-frames only among the 1, 4, 5, 6, 9, 10 sub-frames for the LTE FDD terminal not capable of the hybrid duplex frame structure, and authorizes the LTE FDD terminal not capable of the hybrid duplex frame structure to send UL data only in the 3, 4, 5, 8, 9, 10 sub-frames.

In above example, the hybrid duplex communication system may be compatible with the LTE FDD terminal.

In addition, in order to be compatible with the LTE FDD terminal, the BS should not schedule sub-frames on the slave carrier used as DL, and corresponding sub-frames on master carrier of which HARQ feedbacks are associated with those sub-frames on the slave carrier according to LTE FDD operation rules.

The Third Example

In the example, the hybrid duplex communication system adopts frame structure parameters of the LTE, including subcarrier interval, Cyclic Prefix (CP), length of a radio frame and length of a sub-frame. For a normal CP, one sub-frame includes 14 symbols with the length of 66.7 μm, and the length of the CP of the first symbol is 5.21 μm, the length of the CP of any of other 6 symbols is 4.69 μm. For an extended CP, one sub-frame includes 12 symbols, and the length of the CP of each of all symbols is 16.67 μm.

As shown in FIG. 9, the hybrid duplex communication system includes paired carriers. The radio frame structure of the master carrier includes special sub-frames, and each special sub-frame includes a DL special time slot, a guard time slot, and an UL pilot time slot. The PSS, SSS and PBCH of the master carrier may be used by the terminal to perform cell search. In addition, just like the LTE system, the master carrier further includes a DBCH. A PDCCH is used to indicate the DBCH, bear necessary System Information Blocks (SIBs) except Master Information Blocks (MIBs) on the PBCH. As shown in FIG. 9, the slave carrier is a complete stand-alone LTE TDD carrier where communication can be operated individually), and includes complete LTE TDD designs including the PSS, SSS, PBCH, and so on.

The hybrid duplex communication system, as shown in FIG. 9, may be compatible with the LTE TDD terminal. The LTE TDD terminal will perform operations on the slave carrier of the hybrid duplex communication system according to the LTE TDD mode Because the synchronization channel of the master carrier differs from that of the slave carrier, a terminal capable of the hybrid duplex mode may identify that which one is the master carrier, and perform cell search and obtain broadcast information on the master carrier. A LTE TDD terminal not capable of the hybrid duplex mode can only obtain information of the slave carrier.

The hybrid duplex wireless communication BS may perform DL transmission in DL sub-frames and DL special time slots of the master carrier, and receive a SRS in the UL pilot time slot of a special sub-frame of the master carrier to obtain the channel reciprocity. Thus the feedback overhead required by multi-antenna transmission (e.g., beam forming) may be reduced.

After performing cell search in the master carrier, and obtaining DL synchronization and a cell identifier, the UE capable of hybrid duplex mode may read broadcast information on the master carrier.

A broadcast messages sent by the hybrid duplex wireless communication BS includes configuration information of special sub-frames (denoted by IE-X), indicating the number, locations of special sub-frames in the radio frame, and length configuration information of each time slot (the length is represented by the number of symbols). The configuration information may be sent based on look-up table. For example, an established configuration table may include various configuration combinations supported by the system. The terminal may be informed of an index in the configuration table through the signal, and may obtain configuration information of special sub-frames on the master carrier by looking up the configuration table based on the IE-X. As shown in FIG. 9, the terminal may, according to an index indicated by bits of the IE-X, obtains that one radio frame includes 2 special sub-frames respectively located at the second sub-frame and the seventh sub-frame, and obtains the length of each time slot in a special sub-frame.

The broadcast message sent by the hybrid duplex wireless communication BS further includes a frequency point location (notification of EARFCN) and bandwidth information of the slave carrier, and configuration information of radio frame structure (denoted by IE-Y) of the slave carrier. The configuration information may be sent based on look-up table. The configuration combinations shown in table 1 and table 2 may be obtained. As shown in FIG. 9, the BS may configure the slave carrier as UL and DL time division duplexing carrier according to the requirements of ratio of UL services to DL services, the terminal may, according to the IE-Y, obtain that the first sub-frame and the sixth sub-frame of a radio frame of the slave carrier are DL sub-frames, the second sub-frame and the seventh sub-frame are special sub-frames, other sub-frames are normal UL sub-frames. The broadcast message further includes necessary configuration information for UE's network access and UL data transmission Content of broadcast messages about the slave carrier sent by the hybrid duplex wireless communication BS on the master carrier cannot be contradictory with content of broadcast messages about the slave carrier sent by the hybrid duplex wireless communication BS on the slave carrier, and they need to maintain consistency.

According to pre-conventions, the BS and the terminal capable of the hybrid duplex mode may adopt that the DL sub-frames of the master carrier and the UL sub-frames of the slave carrier cooperates to perform FDD mode communication in which the UL and the DL is not in equal proportion, and the DL sub-frames of the slave carrier and the UL sub-frames of the slave carrier may cooperate to perform conventional TDD mode communication. The timing relationship of a HARQ of data transmission and/or the timing relationship for scheduling are pre-determined, and are related to UL configuration of the slave carrier. When the DL sub-frames of the master carrier and the UL sub-frames of the slave carrier cooperate to perform FDD mode communication, the timing relationship may be implicitly determined by a UL configuration of the slave carrier. When the DL sub-frames of the slave carrier and the UL sub-frames of the slave carrier cooperate to perform TDD mode communication, the timing relationship may be implicitly determined by a UL-DL configuration of the slave carrier. The terminal obtains a UL-DL configuration of the slave carrier (for example the UL-DL configuration #1 may be obtained by means of a signal), so that the terminal may lean that the 3, 4, 5, 7, 8, 9 sub-frames are UL sub-frames, the ACK/NACK message for the HARQ of DL data transmission of the master carrier adopts the timing relationship shown in FIG. 6 (when the timing relationship is pre-determined, the compromise of ACK/NACK load balance and time delay will be considered), and the ACK/NACK message for the HARQ of DL data transmission of the slave carrier adopts the timing relationship shown in FIG. 7. The UL data transmission is similar to above mentioned processing.

The LTE TDD terminal not capable of the hybrid duplex mode can obtain DL synchronization on the slave carrier, read broadcast messages, and complete cell search and UL access process, and then perform LTE TDD communication according to the UL-DL configuration (the configuration #0 in table 1) shown in FIG. 9.

The Fourth Example

In the example, the hybrid duplex communication system adopts frame structure parameters of the LTE, including subcarrier interval, CP, length of a radio frame and length of a sub-frame. For a normal CP, one sub-frame includes 14 symbols with the length of 66.7 μm, and the length of the CP of the first symbol is 5.21 μm, the length of the CP of any of other 6 symbols is 4.69 μm. For an extended CP, one sub-frame includes 12 symbols, and the length of the CP of each of all symbols is 16.67 μm.

As shown in FIG. 9, the hybrid duplex communication system includes paired carriers. The radio frame structure of the master carrier includes special sub-frames, and each special sub-frame includes a DL special time slot, a guard time slot, and an UL pilot time slot. The PSS, SSS and PBCH of the master carrier are used by the terminal to perform cell search. Just like the LTE system, the master carrier further includes a DBCH. A PDCCH is used to indicate the DBCH, bear necessary System Information Blocks (SIBs) except Master Information Blocks (MIBs) on the PBCH. As shown in FIG. 9, the slave carrier is a complete stand-alone LTE TDD carrier on which communication can be operated separately, and includes complete LTE TDD designs including the PSS, SSS, PBCH, and so on.

The hybrid duplex communication system, as shown in FIG. 9, may be compatible with the LTE TDD terminal. The LTE TDD terminal will perform operations on the slave carrier of the hybrid duplex communication system according to the LTE TDD mode. Because the synchronization channel of the master carrier differs from that of the slave carrier, a terminal capable of the hybrid duplex mode may identify that which one is the master carrier, and perform cell search and obtain broadcast information on the master carrier. A LTE TDD terminal not capable of the hybrid duplex mode can only obtain information of the slave carrier.

The hybrid duplex wireless communication BS may perform DL transmission in DL sub-frames and DL special time slots of the master carrier, and receive a SRS in the UL pilot time slot of a special sub-frame of the master carrier to obtain the channel reciprocity. Thus the feedback overhead required by multi-antenna transmission (e.g., beam forming) may be reduced.

After performing cell search in the master carrier, and obtaining DL synchronization and a cell identifier, the UE capable of the hybrid duplex mode may read broadcast information on the master carrier.

A broadcast messages sent by the hybrid duplex wireless communication BS includes configuration information of special sub-frames (denoted by IE-X), indicating the number, locations of special sub-frames in the radio frame, and length configuration information of each time slot (the length is represented by the number of symbols). The configuration information may be sent based on look-up table. For example, an established configuration table may include various configuration combinations supported by the system. The terminal may be informed of an index in the configuration table through the signal, and may obtain configuration information of special sub-frames on the master carrier by looking up the configuration table based on the IE-X. As shown in FIG. 9, the terminal may, according to an index indicated by bits of the IE-X, obtains that one radio frame includes 2 special sub-frames respectively located at the second sub-frame and the seventh sub-frame, and obtains the length of each time slot in a special sub-frame.

The broadcast message sent by the hybrid duplex wireless communication BS further includes a frequency point location (notification of EARFCN) and bandwidth information of the slave carrier, other broadcast messages related to the slave carrier may be only broadcasted on the slave carrier. After obtaining the frequency point location of the slave carrier, the terminal capable of the hybrid duplex mode may send broadcast messages again in the light of the synchronization and broadcast locations, so as to obtain necessary broadcast messages including configuration information of radio frame structure (denoted by IE-Y) of the slave carrier. The configuration information of the radio frame structure may be sent based on look-up table. The configuration combinations shown in table 1 and table 2 may be obtained. As shown in FIG. 9, the BS may configure the slave carrier as UL and DL time division duplexing carrier according to the requirements of ratio of UL services to DL services, the terminal may, according to the IE-Y, obtain that the first sub-frame and the sixth sub-frame of a radio frame of the slave carrier are DL sub-frames, the second sub-frame and the seventh sub-frame are special sub-frames, other sub-frames are normal UL sub-frames. The broadcast messages further include necessary configuration information for UL data transmission and network access by the terminal.

According to pre-conventions, the BS and the terminal capable of the hybrid duplex mode may adopt that the DL sub-frames of the master carrier and the UL sub-frames of the slave carrier cooperates to perform FDD mode communication in which the UL and the DL is not in equal proportion, and the DL sub-frames of the slave carrier and the UL sub-frames of the slave carrier may cooperate to perform conventional TDD mode communication. The timing relationship of a HARQ of data transmission and/or the timing relationship for scheduling are pre-determined, and are related to UL configuration of the slave carrier. When the DL sub-frames of the master carrier and the UL sub-frames of the slave carrier cooperate to perform FDD mode communication, the timing relationship may be implicitly determined by a UL configuration of the slave carrier. When the DL sub-frames of the slave carrier and the UL sub-frames of the slave carrier cooperate to perform TDD mode communication, the timing relationship may be implicitly determined by a UL-DL configuration of the slave carrier. The terminal obtains a UL-DL configuration of the slave carrier (for example the UL-DL configuration #1 may be obtained by means of a signal), so that the terminal may lean that the 3, 4, 5, 7, 8, 9 sub-frames are UL sub-frames, the ACK/NACK message for the HARQ of DL data transmission of the master carrier adopts the timing relationship shown in FIG. 6 (when the timing relationship is pre-determined, the compromise of ACK/NACK load balance and time delay will be considered), and the ACK/NACK message for the HARQ of DL data transmission of the slave carrier adopts the timing relationship shown in FIG. 7. The UL data transmission is similar to above mentioned processing.

The LTE TDD terminal not capable of the hybrid duplex mode can obtain DL synchronization on the slave carrier, read broadcast messages, and complete cell search and UL access process, and then perform LTE TDD communication according to the UL-DL configuration (the configuration #0 in table 1) shown in FIG. 9.

Compared with the third example, the fourth example may avoid transmitting the broadcast message repeatedly, and separate the master carrier and the slave carrier, which increases the flexibility, but brings certain complexity for the terminal capable of the hybrid duplex mode.

Corresponding to above mentioned method, the present disclosure also provides a terminal and a BS which will be described hereinafter with reference to accompanying drawings.

FIG. 10 is a schematic diagram illustrating a terminal according to an example of the present disclosure. The terminal may include a configuration acquisition module 1010, a sounding module 1020 and a communication module 1030.

The configuration acquisition module 1010 is configured to obtain configuration information, and configure locations of special sub-frames on a first carrier and a transmission direction of each sub-frame on a second carrier. Other sub-frames except special sub-frames on the first carrier are DL sub-frames.

The sounding module 1020 is configured to send a SRS on a special sub-frame.

The communication module 1030 is configured to, when all sub-frames on the second carrier are UL sub-frames, communicate with a BS on the first carrier and the second carrier according to FDD mode; and when the second carrier is used for UL and DL transmission in time division multiplexing mode, communicate with the BS on DL resources of the first carrier and UL resources of the second carrier according to the FDD mode, and/or, communicate with the BS on DL resources of the second carrier and UL resources of the second carrier according to the TDD mode.

FIG. 11 is a schematic diagram illustrating a BS according to an example of the present disclosure. The BS may include a configuration module 1110, a sounding detection module 1120 and a communication module 1130.

The configuration module 1110 is configured to configure locations of special sub-frames on a first carrier and a transmission direction of each sub-frame on a second carrier. Other sub-frames except special sub-frames on the first carrier are DL sub-frames.

The sounding detection module 1120 is configured to receive a SRS on a special sub-frame on the first carrier.

The communication module 1130 is configured to, when all sub-frames on the second carrier are UL sub-frames, communicate with a terminal on the first carrier and the second carrier according to FDD mode; and when the second carrier is used for UL and DL transmission in time division multiplexing mode, communicate with the terminal on DL resources of the first carrier and UL resources of the second carrier according to the FDD mode, and/or, communicate with the terminal on DL resources of the second carrier and UL resources of the second carrier according to the TDD mode.

The foregoing description is only preferred embodiments of the present invention and is not used for limiting the protection scope thereof. Any modification, equivalent substitution, or improvement made without departing from the spirit and principle of the present invention should be covered by the protection scope of the present invention.

The proposed method and apparatus for transmitting and receiving data in a communication system using beamforming may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, the efficiency of time and frequency resources is increased by providing a method for transmitting and receiving data in consideration of a decoding latency of a scheduling assignment channel allocated to an MS in a communication system using beamforming.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A hybrid duplex communication method by a terminal, comprising:
   receiving, from a base station (BS), by the terminal capable of supporting a frequency division duplex (FDD) mode and a time division duplex (TDD) mode, configuration information comprising a first configuration of at least one special sub-frame on a first carrier and a second configuration of a transmission direction of each sub-frame on a second carrier, wherein the configuration information is received on the first carrier, and all sub-frames except the special sub-frame on the first carrier are downlink sub-frames;
   sending a sounding reference symbol on the special sub-frame;
   in response to the second configuration indicating that all sub-frames on the second carrier are uplink sub-frames, communicating with the BS on the first carrier and the second carrier according to the FDD mode; and
   in response to the second configuration indicating that sub-frames on the second carrier comprises uplink sub-frames and downlink sub-frames, communicating with the BS by using at least one downlink sub-frame on the first carrier and at least one uplink sub-frame on the second carrier according to the FDD mode, and simultaneously communicating with the BS by using at least one downlink sub-frame and at least one uplink sub-frame on the second carrier according to the TDD mode,
   wherein a timing relationship of a hybrid automatic repeat request (HARQ) or a timing relationship for scheduling is determined according to a number and locations of uplink sub-frames in a frame structure of the second carrier, when the terminal operates according to the FDD mode based on the second configuration, and wherein the timing relationship of the HARQ or the timing relationship for the scheduling is determined according to a ratio of uplink and downlink sub frames and locations of uplink and downlink sub-frames on the second carrier, when the terminal operates according to the TDD mode based on the second configuration.

2. The method according to claim 1, wherein the special sub-frame comprises a first time slot, a second time slot, and a third time slot, wherein the configuration information comprises configuration of a length of each time slot in the special sub-frame, wherein the method further comprises receiving a downlink channel on the first time slot, wherein the second time slot is a guard time slot, and wherein sending the sounding reference symbol on the special sub-frame comprises sending the sounding reference symbol on the third time slot.

3. The method according to claim 2, wherein the downlink channel received on the first time slot comprises at least one of a physical downlink control channel, a physical downlink data channel, a physical synchronization channel, a physical broadcasting channel, or a physical hybrid automatic retransmission request indicator channel.

4. The method according to claim 2, wherein obtaining the configuration information comprises obtaining indication information indicating a number of the at least one special sub frame, locations of the at least one special sub frame, and a configuration of each time slot in the at least one special sub frame from a control signal received on the first carrier, obtaining indication information indicating an uplink-downlink sub-frame ratio in the frame structure of the second carrier from a control signal received on the first carrier or the second carrier, and obtaining a frequency point location and bandwidth information of the second carrier from a control signal received on the first carrier.

5. The method according to claim 4, wherein the control signal comprises a signal sent in broadcast manner or a dedicated signal sent to the terminal.

6. The method according to claim 4, wherein the indication information obtained from the control signal comprises an index; and wherein the method further comprises obtaining corresponding configuration information based on a look-up table according to the index.

7. The method according to claim 1, wherein the at least one special sub frame comprises at least one of a multicast broadcast single frequency network (MBSFN) sub-frames.

8. A terminal, comprising:
at least one processor configured to receive, from a base station (BS), configuration information comprising a first configuration of at least one special sub-frame on a first carrier and a second configuration of a transmission direction of each sub-frame on a second carrier, wherein the configuration is received on the first carrier, and all sub-frames except special sub-frames on the first carrier are downlink sub-frames; and a transceiver configured to:
be capable of supporting a frequency division duplex (FDD) mode on one carrier and a time division duplex (TDD) mode on separate carriers,
send a sounding reference signal (SRS) on the special sub-frame,
in response to the second configuration indicating that all sub-frames on the second carrier are uplink sub-frames, communicate with the BS on the first carrier and the second carrier according to the FDD mode, and in response to the second configuration indicating that sub-frames on the second carrier comprises uplink sub-frames and downlink sub-frames, communicate with the BS by using at least one downlink sub-frame on the first carrier and at least one uplink sub-frame on the second carrier according to the FDD mode, and simultaneously communicating with the BS by using at least one downlink sub-frame and at least one uplink sub-frame on the second carrier according to the TDD mode, wherein a timing relationship of a hybrid automatic repeat request (HARD) or a timing relationship for scheduling is determined according to a number and locations of uplink sub-frames in a frame structure of the second carrier, when the terminal operates according to the FDD mode based on the second configuration, and wherein the timing relationship of the HARQ or the timing relationship for the scheduling is determined according to a ratio of uplink and downlink sub-frames and locations of uplink and downlink sub-frames on the second carrier, when the terminal operates according to the TDD mode based on the second configuration.

9. The terminal according to claim 8, wherein the special sub-frame comprises a first time slot, a second time slot, and a third time slot, wherein the configuration information comprises configuration of a length of each time slot in the special sub-frame, wherein the transceiver is further configured to receive a downlink channel on the first time slot, wherein the second time slot is a guard time slot, and wherein sending a sounding reference symbol on the special sub-frame comprises sending the sounding reference signal on the third time slot.

10. A base station (BS), comprising:
at least one processor configured to generate a first configuration of at least one special sub-frame on a first carrier and a second configuration of a transmission direction of each sub-frame on a second carrier, wherein configuration information is received on the first carrier, and all sub-frames except special sub-frames on the first carrier are downlink sub-frames; and a transceiver configured to:
be capable of supporting a frequency division duplex (FDD) mode on one carrier and in a time division duplex (TDD) mode on separate carriers,
transmit configuration information comprising the first configuration and the second configuration,
receive a sounding reference signal (SRS) on the special sub-frame,
in response to the second configuration indicating that all sub-frames on the second carrier are uplink sub-frames, communicate with a terminal on the first carrier and the second carrier according to the FDD mode, and in response to the second configuration indicating that sub-frames on the second carrier comprises uplink sub-frames and downlink sub-frames, communicate with the terminal by using at least one downlink sub-frame on the first carrier and at least one uplink sub-frame on the second carrier according to the FDD mode, and simultaneously communicate with the terminal by using at least one downlink sub-frame and at least one uplink sub-frame on the second carrier according to the TDD mode, wherein a timing relationship of a hybrid automatic repeat request (HARQ) or a timing relationship for scheduling is determined according to a number and locations of uplink sub-frames in a frame structure of the second carrier, when the terminal operates according to the FDD mode based on the second configuration, and wherein the timing relationship of the HARQ or the timing relationship for the scheduling is determined according to a ratio of uplink and downlink sub-frames and locations of uplink and downlink sub-frames on the second carrier, when the terminal operates according to the TDD mode based on the second configuration.

11. The BS according to claim 10, wherein the special sub-frame comprises a first time slot, a second time slot, and a third time slot, wherein the configuration information comprises configuration of a length of each time slot in the special sub-frame, wherein the transceiver is further configured to receive a downlink channel on the first time slot, wherein the second time slot is a guard time slot, and wherein sending a sounding reference symbol on the special sub-frame comprises sending the sounding reference signal the third time slot.

12. A hybrid duplex communication method by a base station (BS), comprising:

generating, by the BS capable of supporting a frequency division duplex (FDD) mode and a time division duplex (TDD) mode on separate carriers, a first configuration of at least one special sub-frame on a first carrier and a second configuration of a transmission direction of each sub-frame on a second carrier, wherein first and second configuration information is received on the first carrier, and all sub-frames except special sub-frames on the first carrier are downlink sub-frames;

transmitting configuration information comprising the first configuration and the second configuration;

receiving, from a terminal, a sounding reference signal (SRS) on the special sub-frame;

in response to the second configuration indicating all sub-frames on the second carrier are uplink sub-frames, communicating with the terminal on the first carrier and the second carrier according to the FDD mode; and in response to the second configuration indicating that sub-frames on the second carrier comprises uplink sub-frames and downlink sub-frames, communicating with the terminal by using at least one downlink sub-frame on the first carrier and at least one uplink sub-frame on the second carrier according to the FDD mode, and simultaneously communicating with the terminal by using at least one downlink sub-frame and at least one uplink sub-frame on the second carrier according to the TDD mode, wherein a timing relationship of a hybrid automatic repeat request (HARQ) or a timing relationship for scheduling is determined according to a number and locations of uplink sub-frames in a frame structure of the second carrier, when the terminal operates according to the FDD mode based on the second configuration, and wherein the timing relationship of the HARQ or the timing relationship for the scheduling is determined according to a ratio of uplink and downlink sub-frames and locations of uplink and downlink sub-frames on the second carrier, when the terminal operates according to the TDD mode based on the second configuration.

* * * * *